United States Patent [19]

Young

[11] Patent Number: 4,494,434

[45] Date of Patent: Jan. 22, 1985

[54] QUICK POSITIONING CUT-OFF GUIDE FOR HAND POWER SAWS

[76] Inventor: Robert W. Young, 2151 Pimmit Dr., Falls Church, Va. 22043

[21] Appl. No.: 394,504

[22] Filed: Jul. 2, 1982

[51] Int. Cl.³ .............................................. B27B 9/04
[52] U.S. Cl. ..................................... 83/745; 83/522; 33/479
[58] Field of Search .................. 83/745, 574, 522; 33/468, 479, 480, 197

[56] References Cited

U.S. PATENT DOCUMENTS

| | | | |
|---|---|---|---|
| 2,773,523 | 12/1956 | Hopla | 83/745 |
| 2,942,633 | 6/1960 | King | 83/745 |
| 4,028,976 | 6/1977 | Kundikoff | 83/745 |
| 4,056,028 | 11/1977 | Patterson | 83/745 |
| 4,065,114 | 12/1977 | Pennington | 83/745 |
| 4,179,965 | 12/1979 | Johnson | 83/745 |
| 4,306,479 | 12/1981 | Eberhardt | 33/479 |
| 4,335,512 | 6/1982 | Sheps et al. | 83/745 |
| 4,356,748 | 11/1982 | Tilton | 83/745 |

*Primary Examiner*—James M. Meister
*Assistant Examiner*—J. L. Knoble

[57] ABSTRACT

This invention provides a quick and accurate gauging means for locating and clamping a guide onto the top surface and leading edge of a workpiece, with respect to the line of cut desired. During execution of the cut, the gauging member of the guide is automatically returned to its storage position and cocked for the next cut. This guide is completely operable with only one hand, leaving the other hand simultaneously free for holding and operating the portable hand power saw. This invention yields cuts that are accurate and more quickly executed than freehand cuts or cuts where other types of saw guides are employed.

12 Claims, 33 Drawing Figures

FIG I

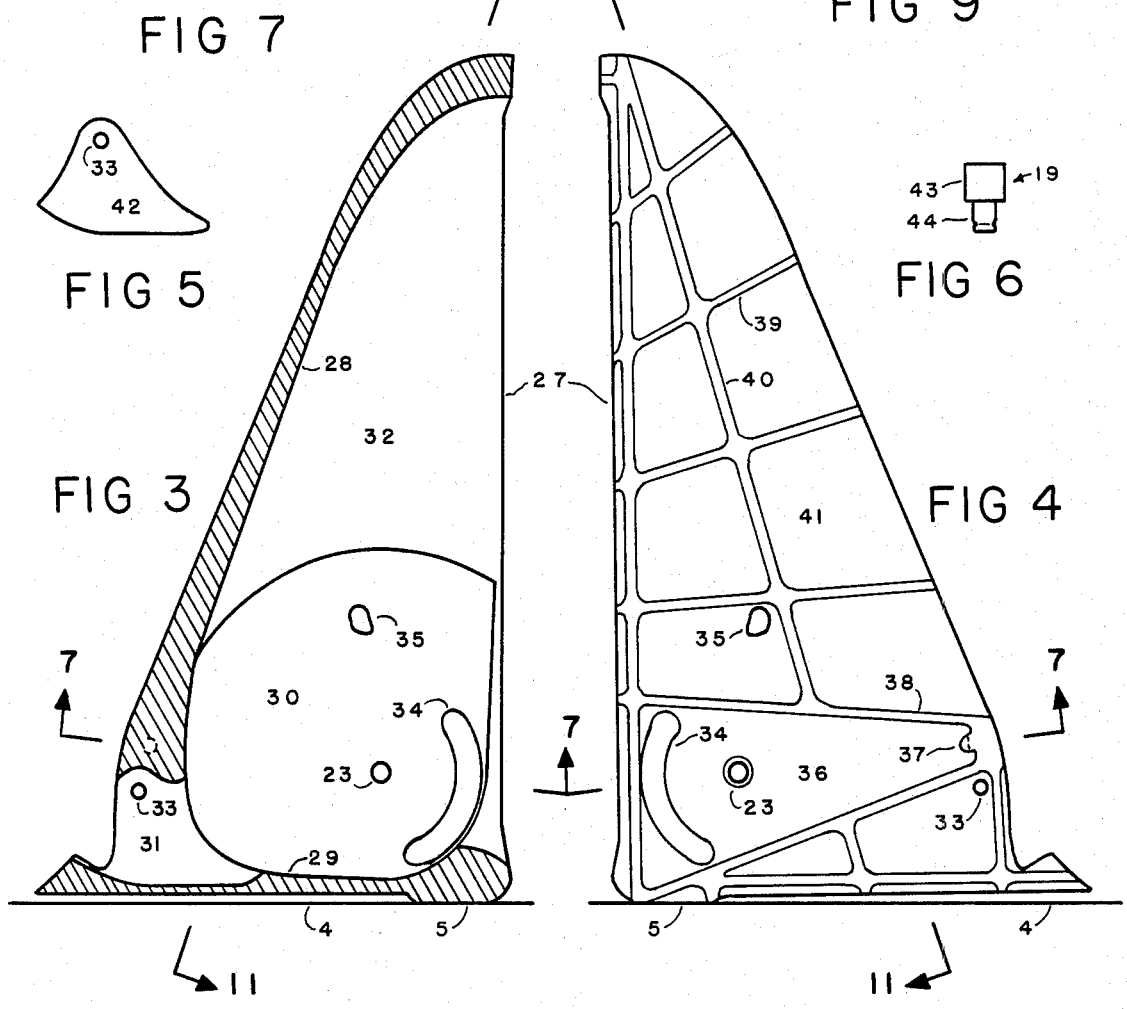

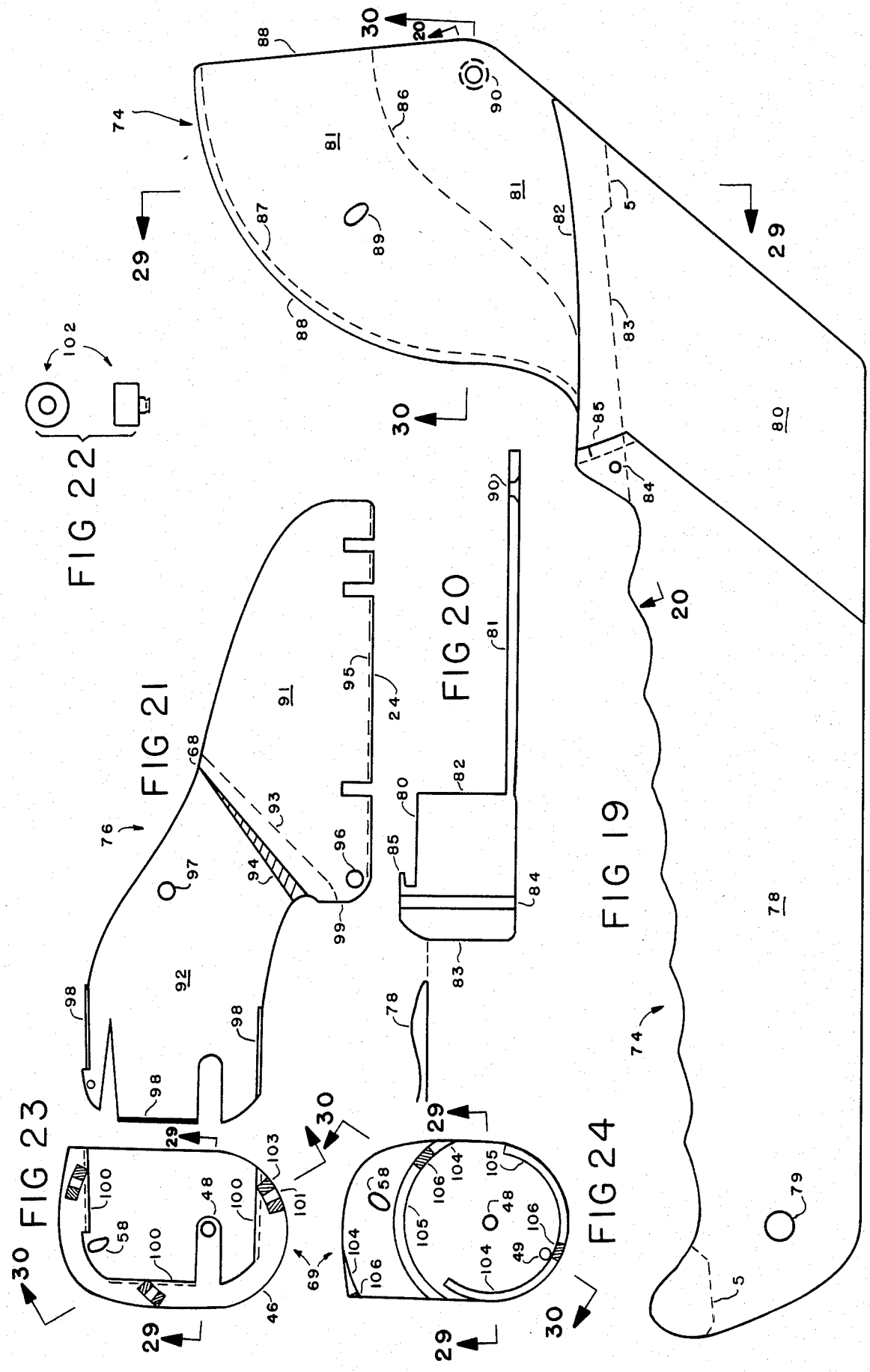

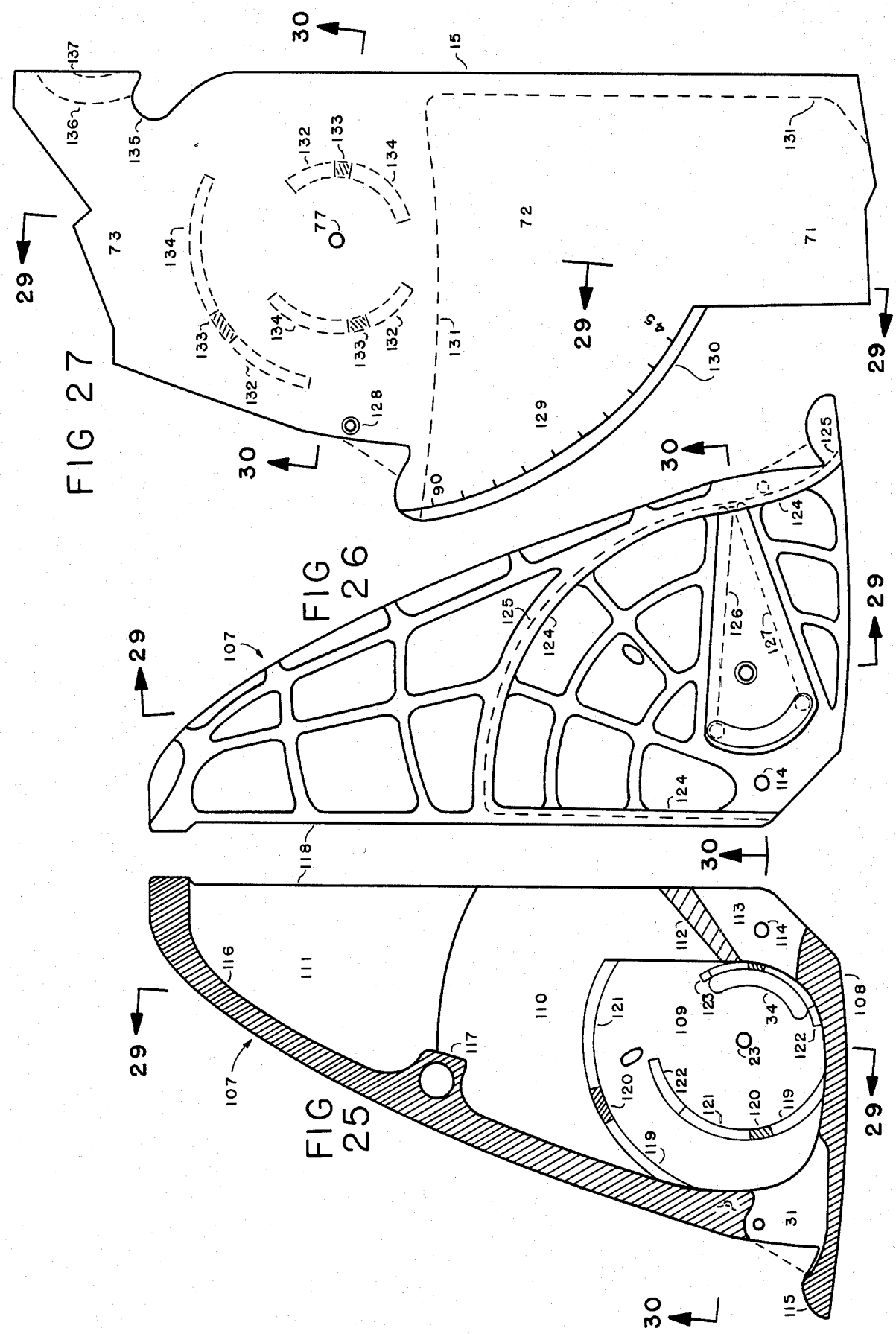

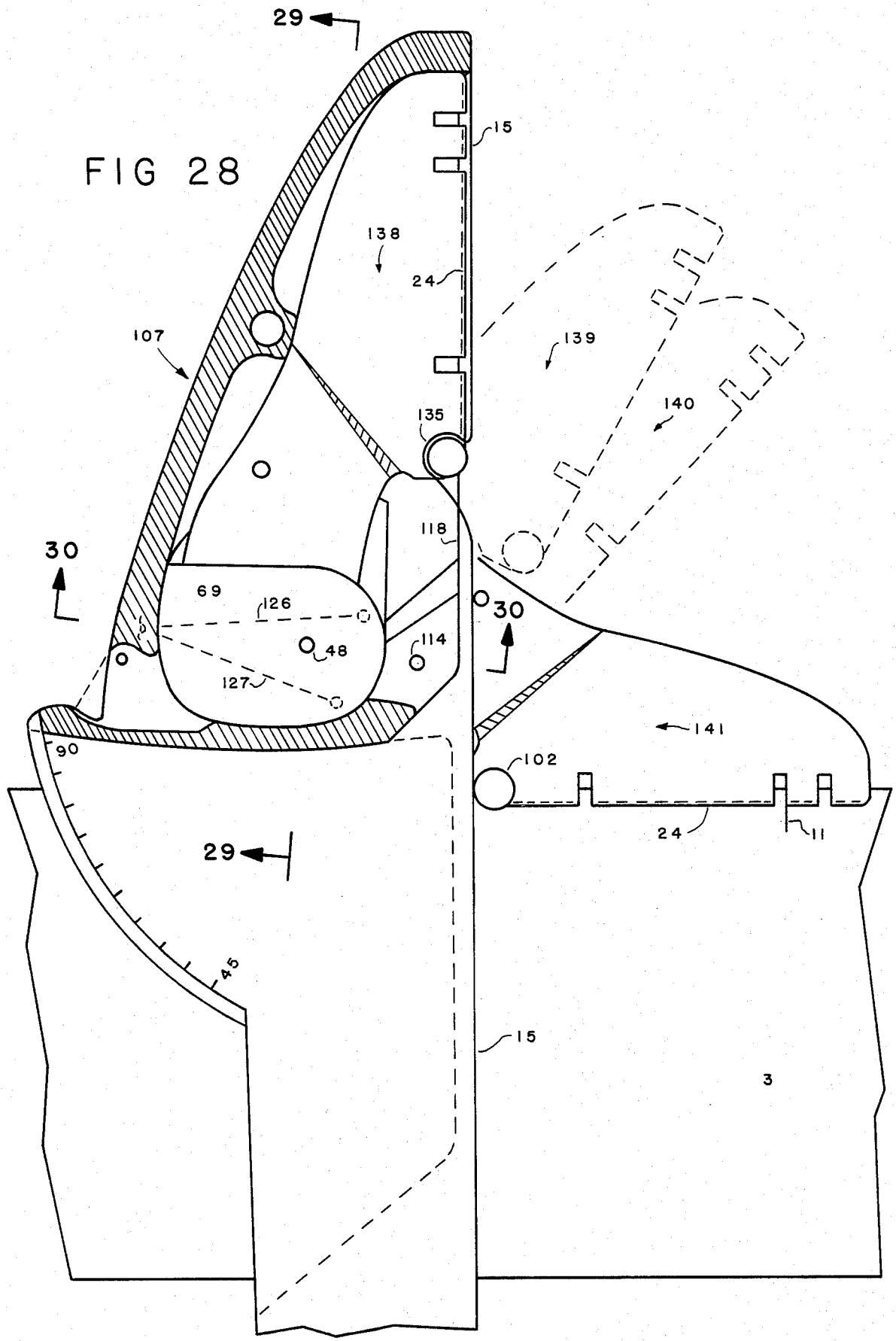

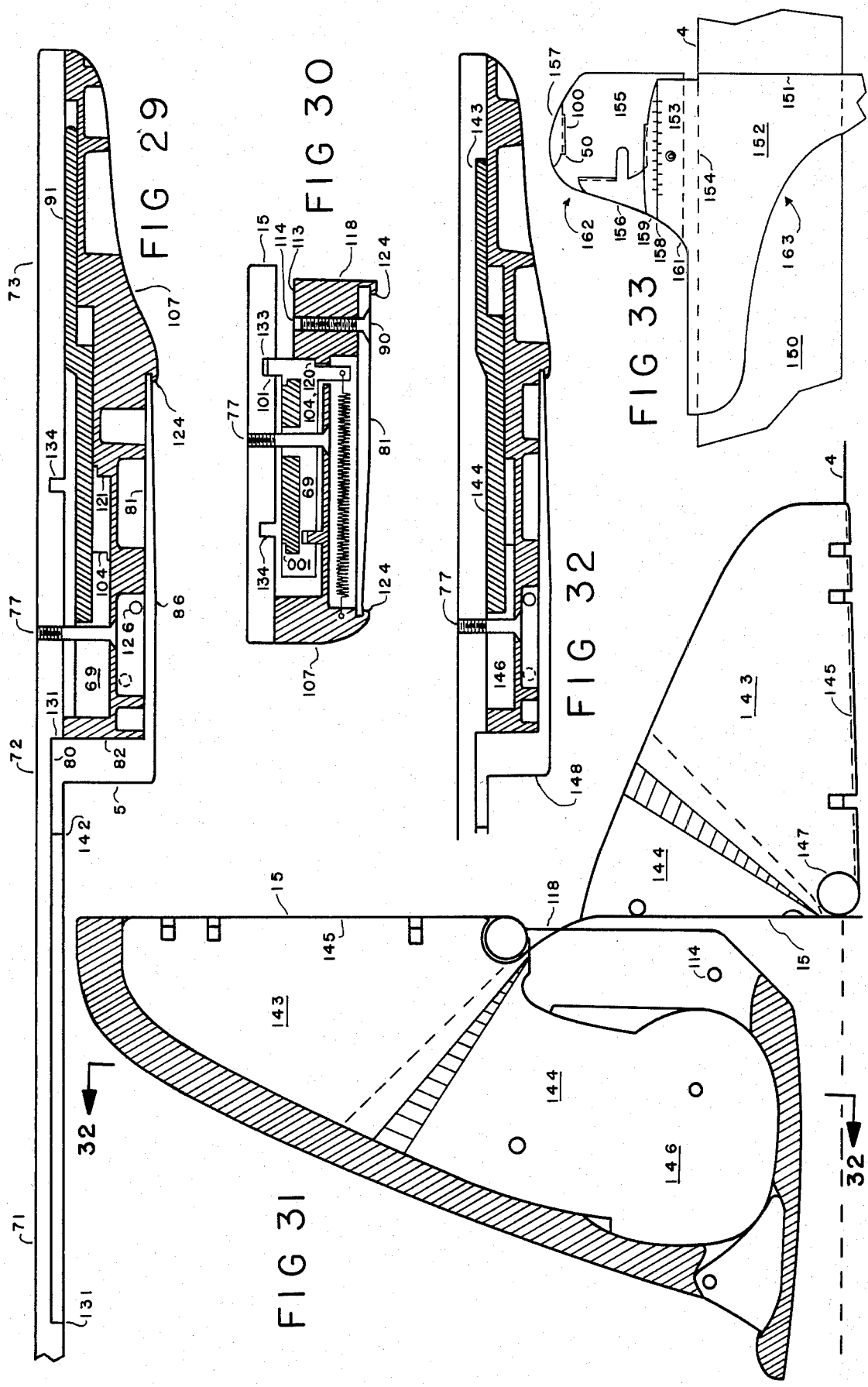

QUICK POSITIONING CUT-OFF GUIDE FOR HAND POWER SAWS

BACKGROUND

The patent literature relating to portable, hand held, power saw guides, both for shorter cut-off or crosscut operations, or for longer cuts in a workpiece, is full of listing the difficulties of freehand guiding of a power saw to effect an accurate cut. Thus the need for a saw guide. Most types of guides make use of the fact that for each saw, there is a constant distance from the saw blade and its associated kerf to either edge of the saw table (or foot, or shoe, or plate) that is parallel to the saw blade. In addition to the basic saw guide designs, there have been many designs to provide a gauging means so as to accurately position the saw guide relative to the line of cut desired. However, some or all of these gauging designs have had one or more of the following limitations:

(a) Both hands were needed—one to hold, position, and then clamp the guide; and the other hand to move the gauge from the storage position to the measure position and then back to the storage position before the saw could be picked up and the cutting operation could begin.

(b) A pencil line had to be drawn across the full top surface where the cut was desired. This operation is an extra step for most cuts and takes time.

(c) The gauge had to be calibrated to the saw and to the blade thickness using a mechanically adjustable pointer(s). This mechanical adjustment takes time and has to be re-calibrated every time a different bevel angle setting of the saw blade is used other than the standard square setting. Also there can be some degree of error in this mechanical setting since it is an artificial and once removed representation from the actual cut. Also, the calibration is lost every time there is a re-calibration.

(d) The gauge setting was good for just one saw with one particular blade; if another saw with its blade on a job site were to be used, the gauge would have to again be re-calibrated, and again the first calibration would be lost, requiring another re-calibration from scratch.

(e) Positioning the gauge on the workpiece, then measuring and marking the workpiece against the gauge, and then re-positioning of the guide.

(f) Only one side of the saw kerf would be shown by the gauge since the kerf area and the other side of the kerf would be cut off from the gauge during calibration or actual use. Thus cutting on only one side of the line could be determined with the gauge.

(g) The gauge could not be brought right up against the cutting mark or line, but only brought up close to the line, permitting a parallax error to occur during positioning.

(h) The guide clamping means was too slow a process.

The net effect of these complications was that, though the gauge would position the guide, it was too cumbersome and slow a process to be employed at the jobsite. And without an accurate and quick gauging means, it became too cumbersome and slow to position a guide by means of trial and error. As a result, most carpenters, on most jobsites, just cut lumber freehand without any guide.

A very large percentage of cuts with a hand power saw in construction work involve the cut-off type of cut, that is, cutting a 1×4, 2×4, 2×6, etc first square at one end if necessary and then cutting it to proper length, again with a square cut.

An object of this invention is to provide a cut-off guide with gauge that is fully operable with only one hand during the entire procedure.

A further object of this invention is to provide a versatile, quick, accurate, permanent, and interchangeable gauging apparatus which shows both sides of the saw kerf.

Yet another object of this invention is to eliminate the step, for square cuts, of drawing a square line across the workpiece after the workpiece is measured and marked to length.

Still another object is to provide both the fixed square guide and the angle adjustable guide. Both embodiments are shown.

The above objects, achieved in this invention, make the saw guide with gauge a quicker, easier, and more accurate method of cutting-off lumber than by the freehand method. Thus a more accurate and stronger product should result in less time with less effort than with the freehand method or with earlier types of saw guides employed.

SUMMARY

The preferred embodiments of this invention are designed primarily for portable, hand held, power saws having a circular blade. However, with only minor modification, the guide could be equally well used for saws having a reciprocating blade. Although the embodiments described below are designed for right-handed operators; the guide could also, with minor modification, be manufactured for left-handed operators.

The preferred embodiments of this invention have a planar main guide frame member which lies flat upon the top surface of the workpiece. Said guide frame member has one edge which forms a guide edge for the left edge of the saw table to ride against during the whole cutting operation. A hand-contoured handle forms one arm of the guide frame. One end of the guide frame has a housing attached to its underside. Pivotally mounted in this housing and said end of the guide frame is a turntable to which is mounted a detachable index. A trigger and spring mechanism activate the turntable and index, causing them to rotate from the storage to the measure or gauging position. Once said index is calibrated to a particular saw or saws for any given angle, square or bevel, adjusted on that saw, the index will then form an accurate and permanent gauge to position the guide with respect to the line of cut desired. The blade and thus the saw kerf can be accurately positioned to either side of or centered on the line of cut.

During the cutting operation, the leading edge of the saw table contacts and then pushes the return post which is attached to the index, causing the index and attached turntable to begin rotating from the measure position back to the storage position. Part way through the rotation cycle, the spring mechanism takes over and returns the turntable and index the rest of the way to the storage position. This return rotation also cocks the trigger and spring mechanism for the next gauging operation.

The saw guide could also be used without activating the index whenever the operator would not wish to calibrate the index, for example for a special bevel setting of the saw blade for a one time special cut not likely to be repeated.

The hand-contoured handle, along with two feet attached thereto on its underside, form a quick means of holding and positioning the guide and then clamping the guide to the workpiece with the left hand. The trigger is operated by the left index finger, thus the right hand is always free throughout the entire guide-positioning and guide-clamping operation.

The guide would best be manufactured from metal or plastic. The interchangeable index should be made out of some strong, transparent, cuttable material, such as certain types of plastic.

Each guide should have available several of the quick-detachable indicies calibrated for different saws the operator may own and for different bevel settings the operator commonly uses. Thus the operator could select one of the indicies that he has already once calibrated, and quickly interchange it in the guide for the special combination of cuts or saws he wishes to employ at that particular occasion.

The invention, in three preferred embodiments, will now be described in detail and with reference to the accompanying drawings.

BRIEF DESCRIPTION OF THE DRAWINGS

FIGS. 1-16 show aspects of the fixed square cut embodiment.

FIG. 1 is a perspective view of the guide and a 2×4 workpiece showing how it is held, the gauging operation, and the beginning of saw cut.

FIG. 2 is a plan view of the guide, showing gauging and saw positioning aspects on a 2×6 workpiece.

FIG. 3 is a plan view of the housing.

FIG. 4 is a plan view of the underside of the housing.

FIG. 5 is a plan view of the trigger.

FIG. 6 is a sectional view of the return post.

FIG. 7 is a sectional view of the housing.

FIG. 8 is a plan view of the turntable.

FIG. 9 is a sectional view of the turntable.

FIG. 10 is a plan view of the index.

FIG. 11 is a sectional view of the housing.

FIG. 12 is a composite plan view of assembled guide in storage position with guide frame removed.

FIG. 13 is a composite plan view of assembled guide in mid-way position with guide frame removed.

FIG. 14 is a composite plan view of assembled guide in measure position with guide frame removed.

FIG. 15 is a sectional view of assembled guide in storage position.

FIG. 16 is a sectional view of assembled guide in storage position.

FIGS. 17-30 show aspects of the angle adjustable embodiment. This is the second embodiment.

FIG. 17 is a plan view of guide set at 90° (square) on a 2×6 workpiece, showing the gauging operation.

FIG. 18 is a plan view of guide set at 45° on a 2×6 workpiece, showing the gauging operation.

FIG. 19 is a plan view of the handle/guide frame and housing rotation plates.

FIG. 20 is a sectional view of the handle/rotation plates.

FIG. 21 is a plan view of the index.

FIG. 22 is a plan view of the underside of the return post and a sectional view of the same.

FIG. 23 is a plan view of the turntable.

FIG. 24 is a plan view of the underside of the turntable.

FIG. 25 is a plan view of the housing.

FIG. 26 is a plan view of the underside of the housing.

FIG. 27 is a plan view of the central section of the guide frame.

FIG. 28 is a composite plan view of the assembled guide with the guide frame as if it were transparent. The index and parts thereof is shown in several positions.

FIG. 29 is a sectional view of assembled guide.

FIG. 30 is a sectional view of assembled guide.

FIGS. 31-32 show aspects of an alternative embodiment of the angle adjustable guide. This is the third embodiment.

FIG. 31 is a composite plan view of the third embodiment.

FIG. 32 is a sectional view of the third embodiment.

FIG. 33 is a reduced scale plan view of a bevel angle calibration jig for the second and third embodiment indicies.

DETAILED DESCRIPTION OF THE PREFERRED EMDODIMENTS

Figure 1:
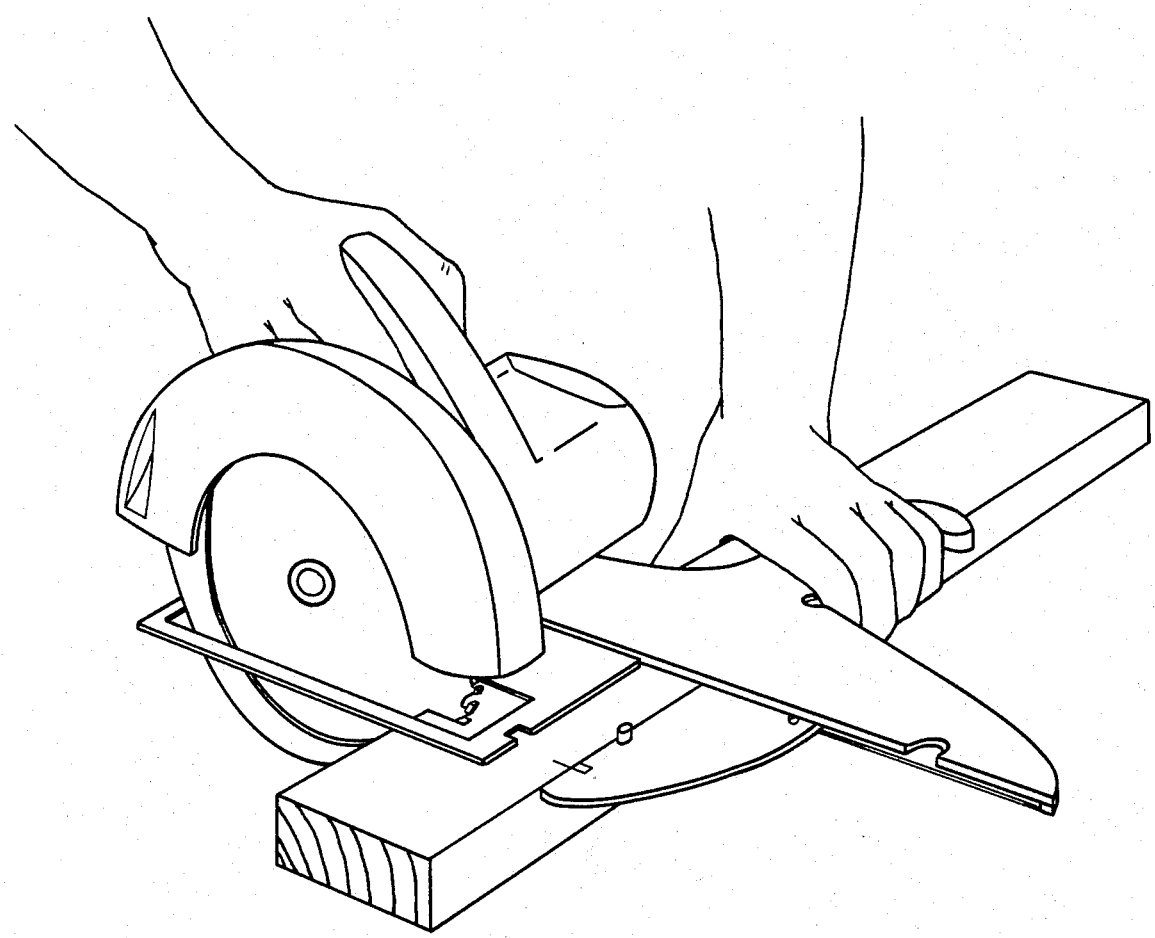

Referring now to the drawings, a preferred embodiment of the fixed 90° (square) guide on a 2×4 workpiece is shown in perspective in FIG. 1. Details of FIG. 1 will be understood from the descriptions of FIGS. 2-16.

Figure 2:
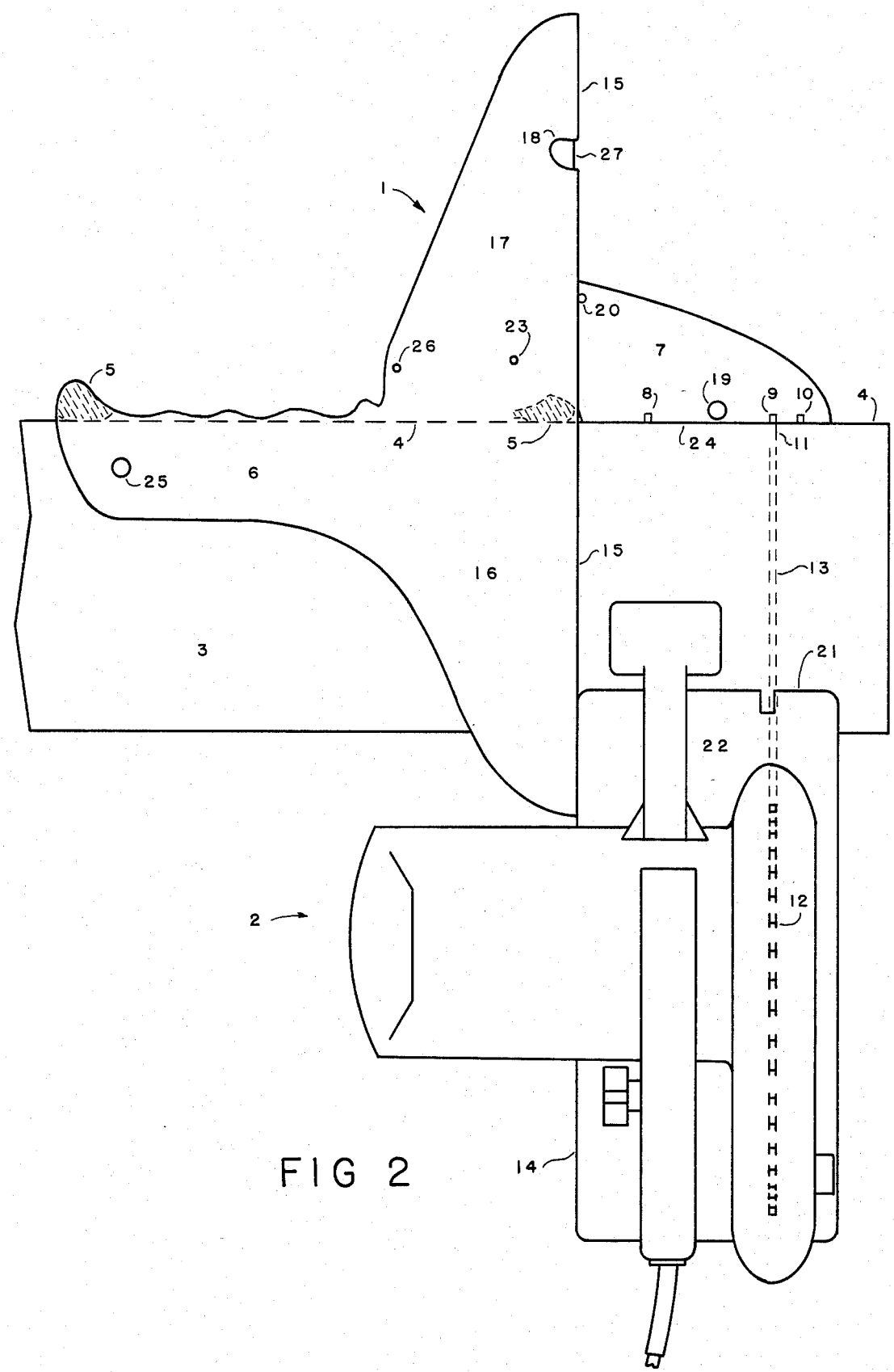

In FIG. 2, saw guide, generally designated 1, and circular power saw, generally designated 2, both in position relative to workpiece 2×6, 3. Saw guide is placed on workpiece 3 so that guide feet 5, projecting downwardly, rest tightly against leading edge 4 of workpiece, using left hand to hold contoured handle 6. The left foot 5 is integrally moulded to the underside of handle 6. The right foot 5 is described later. The left hand slides guide laterally along workpiece leading edge 4 until index 7, with its appropriate calibrated notch 8, 9, or 10 lines up with mark 11 on top surface of workpiece 3 which indicates desired location of line of square cut. Index 7 is so designed that its top surface is in the same plane with the top surface of workpiece 3. Also index is so designed that its leading edge 24, in the measure position, is in continuous contact with leading edge 4 of workpiece 3. In particular, guide and index are so lined up with mark 11 so that either right or left side of notch 8,9, or 10 line up with mark, depending upon which side of mark the blade 12 and its associated kerf 13 is desired to be located. Notch 8 represents a typical worm-drive saw cut position wherein blade 12 is near left edge 14 of saw table 22. Notch 9 represents a typical saw cut position wherein blade 12 is about 3½ inches away from the left edge 14 of saw table (as in the case of a typical 7¼ inch saw); this is the case shown in these figures. Notch 10 represents a typical saw cut position wherein the blade is about 4 inches away from left edge 14 (as is the case of a typical 8 inch saw). If an operator had three such saws as listed above, for example, he could have all three saws calibrated on one index, producing three notches 8, 9, and 10. Shown in FIG. 2 are three such notches for three saws, each blade of which is set at a bevel angle of 0° off from square (blade is 90° to saw table 22). In addition to notches for the blades set square, the operator could also calibrate the same or other indicies, at his discretion (depending on the geometry of the cuts—how much clarity or confusion would result from the crowding of the notches together), for bevel settings on the saws for 45° or any other frequently used or desired angle. The indicies could be marked with a permanent felt tip marker to indicate which saw and which bevel angle each notch represented. Perhaps five blank indicies should be initially provided with each guide, along with several spare return posts 19. Provision should be made for packs of 5 indicies (for example), and several spare return posts 19 to be purchased separately whenever desired. Thus an operator could calibrate several indicies with any combination of separate saws and square or bevel angles as he desired. Such indicies would be permanent and accurate calibrations readily available without the need of any future calibrations, until a new blade of different thickness was installed in a saw.

Throughout the whole gauging and cutting operation, the operator's right hand is always free to hold the saw. Once the guide is correctly positioned, as described above, it can then be clamped with the left hand to the workpiece by applying pressure on the handle to clamp the feet tightly against leading edge 4 and to clamp handle 6 to the top surface of workpiece 3. In FIG. 2 workpiece 3 is a 2×6 (1½×5½ inches). A rubber or vynl or other suitable coating may be applied to the contact surfaces of the feet, and also if suitable, the same coating may be applied to the underside of handle 6 and the underside of the lower half 16 of the guide member.

Once the guide is correctly positioned and clamped, the left edge 14 of the saw table 22 is abutted against the elongated guide edge 15 of the lower section 16 of the guide. The saw is pushed through the workpiece while cutting and sufficient and continuous pressure is maintained to keep table edge 14 sliding against guide edge 15.

Before the cut is completed, leading edge 21 of table 22 will come in contact with return post 19 which is secured to index. As the cut continues, leading edge 21 will cause return post 19 and index 7 to rotate counter clockwise around pivot hole/shaft 23. Index 7 maintains its top surface in the same plane as the top surface of the workpiece at all times: in the measure position, during rotation, and in the storage position. At a certain point in the rotation cycle, the spring mechanism (described in later figures) will take over and complete the rotation cycle to bring index to storage position. In the storage position, index has rotated all the way under the lower surface of the upper portion 17 of the main guide frame 1. Notch 18 in the upper portion 17 is to accomodate return post 19 in the storage position.

The guide member, otherwise referred to as the guide frame, is composed of three main areas: handle 6, lower portion 16 and upper guide portion 17. All three areas comprise one guide frame which can be cast as one piece from metal or plastic.

As the rotation cycle of the index takes place, the cutting operation also continues to completion, table edge 14 following edge 15 of first the lower portion 16, and then both the lower portion 16 and upper portion 17.

The rotation cycle described above automatically cocks the trigger/spring mechanism (described in later figures) for the next gauging operation. The trigger rotates on shaft 26. Hole 25 is for hanging the guide when not in use.

Calibration of the index for a particular saw, with a particular blade, at a particular square or bevel angle setting is accomplished by first locking the index 7 in the measure position (index position shown in FIG. 2). The index is locked by removing snap-lock return post 19 from its hole, as shown in FIG. 2, and then snap-locking it in hole 20 of the index from the underside of the index. Thus the outer circumference of return post 19 will abut against housing edge 27 (housing to be described later) and will prevent any rotation of index, and index will be locked in measure positon. Then guide is positioned anywhere near the right end of a workpiece so that blade 12 will either cut through workpiece 3 or will clear the right end of workpiece by a little bit. The saw is operated, as described earlier of a regular cut-off operation, as far as allowing the saw blade to cut into the index so as to produce a kerf notch (such as 8, 9, or 10) of approximately ¼ inch in length from leading edge 24 of the index. Other calibrations for other bevel settings or for other saws may next be accomplished as described above. Then return post 19 may be removed from hole 20 and snap-locked in its normal position for regular cutting operations. Or, index 7 may be quickly removed from guide and another index may quickly be inserted for further calibrations.

The guide shown in FIGS. 1-16 is designed for lumber up to about 5½ to 6 inches (such as a 2×6) across its top surface 3. The length of guide edge 15 for the lower portion 16 is 7 inches from leading edge 4 of workpiece to the lower tip of portion 16. However, to increase the capacity of the guide up to about 12 inch lumber (such as a 2×12), an extension piece (not shown) for guide edge 15 and lower portion 16 could be so fashioned to interlock and snap-fit in place into lower portion 16 so as to give a straight, rigid lower guide edge 15 of about 13 or 14 inches in length.

A simple and inexpensive storage/carrying case (not shown) of plastic or other suitable material could be fashioned to store the guide and its accessories: a lower portion guide extension, several calibrated and blank indicies, and several spare return posts.

FIGS. 3-11 show different parts of the housing/index assembly.

FIG. 3 is a plan view of the top side of the housing unit. The housing unit houses the trigger, FIG. 5; the turntable, FIG. 8; the index, FIG. 10; and the spring (see FIG. 15). The housing unit is attached to the underside of the upper portion 17 of the guide frame of FIG. 2 The right foot 5 is integrally moulded to the housing and is part of the wall whose top surface is shaded and is shown as 29. The wall, whose top surface is shaded and is shown as 28, surrounds one side of the housing. The shaded surfaces are the surfaces which are joined to the undersurface of the guide frame. Leading edge 27 of the housing is under and slightly offset from guide edge 15 of upper guide portion 17 of FIG. 2 (see also FIG. 15). Elevation of surface of turntable well 30 is ⅜ inch below wall top surfaces 28 and 29, and ⅛ inch below trigger bearing surface 31 and index support surface 32. Trigger shaft hole 33 is seen on surface 31 and is aligned with hole 26 of FIG. 2. Hole 23 in turntable well 30 is for turntable pivot shaft and is aligned with hole of same number in guide frame (see FIG. 2). Arcuate slot 34 allows turntable spring post (described later) to rotate freely. Elongated hole 35 allows quick access to unlock index from turntable (procedure described later). Housing in sectional views may be seen in FIGS. 7, 11.

FIG. 4 is an underside plan view of housing shown in FIG. 3. Spring well surface 36 is bounded and protected by several ribs, such as rib 38. Ribs such as 38, 39, 40 on underside of housing are for strengthening housing bottom plate (such as 41). Housing spring post 37 is moulded to the rib and wall system. The housing could be cast of either metal or plastic.

FIG. 5 is a plan view of trigger 42, with pivot hole 33. Trigger is ¼ inch thick.

FIG. 6 is a side view of index return post 19, otherwise referred to as post. In plan view, both upper 43 and lower 44 portions are circular and are concentric one to the other. Upper portion 43 is 5/16 inch high, the same as the thickness of the guide frame. Lower portion 44 is ¼ inch long, the same as the thickness of the index 7. The lower portion of lower portion 44 has some sort of a notch around it, so that it will snap-lock the return post to the index by mating a similar but reverse shape ridge in either of the two holes 20,45 in the index 7 (see FIG. 2, 10). The return post preferably should be made out of some type of plastic with enough flexibility in it to allow the snap-lock action to work. An alternative means to the snap-lock design as embodied above, lower portion 44 could have its entire length threaded and holes 20 and 45 of index (see FIG. 10) could have matching threads which would also provide a quick means of attaching and removing return post from index. The post could be screwed and unscrewed by hand, without the need of a screwdriver.

FIG. 7 is a transverse sectional view of housing along line 7 in FIGS. 3,4. Top surface 28 of housing wall is ⅜ inch above turntable well surface 30. Spring well surface 36 forms the underside of the housing bottom plate, the top surface is 30. Housing spring post 37 has a small hole to hold one end of the spring (see FIG. 15). Transverse rib 38 of FIG. 4 is shown as it would be if projected onto line 7 to show its relative size, etc in FIG. 7.

FIG. 8 is a plan view of turntable, generally shown as 59. Top surface 46 of turntable wall is shown shaded. Lower turntable surface 47 is bearing or resting surface for index 7 to slide and rest on. Elongated hole 58 matches hole 35 in FIGS. 3, 4 and allows quick access for unlocking index from turntable (described later). Hole 48 is for turntable pivot shaft and matches hole 23 of housing and guide frame. Turntable spring post 49 projects downwardly from bottom surface of turntable and can be seen in section 9 shown in FIG. 9. Turntable can be cast from metal or plastic.

FIG. 9 as a sectional view of turntable in FIG. 8 along line 9. Turntable spring post 49 projects downwardly 9/32 inch from bottom surface 54 of turntable and has a small hole in it to secure one end of spring (see FIG. 15). Height of turntable is ⅜ inch from undersurface 54 to top surface 46 of turntable wall. Height of turntable wall from index bearing surface 47 to surface 46 is ¼ inch. Thickness from surface 54 to surface 47 is ⅛ inch.

FIG. 10 is a plan view of index 7, otherwise referred to as index member. Notches 8, 9, 10 do not exist in a blank index but are typical calibration notches made later by the saw operator. Index is ¼ inch thick throughout and is cast from a clear, tough, cuttable, chip and crack resistant plastic. Leading edge 24, otherwise referred to as straight edge portion, is about 4½ inches long. Hole 45 is the same diameter as the lower portion 44 of return post 19 and has a corresponding and mating circular ridge formed in it to snap-lock with the notch of lower portion 44. Hole 45 holds return post in its normal operating positon. Hole 20 is the same size and shape as hole 45, except upside down, so as to allow return post to be snap-locked from the underside of index. See description under FIG. 6 for an alternative design to the snap-lock feature. Also see FIGS. 17, 18, 21, and 28 for an alternative normal operating position on index for the return post and return post hole 45. The shape of the left end of the index is such that it will exactly mate the shape of the inner wall of the turntable; for example edge 53 of index will abutt wall 52 of turntable, with locking shoulder 51 of index locking against shoulder 50 of turntable wall, and so on all the way around the inner wall of turntable. Arm 55 of index is made flexible by a separation 56 along one side of the arm so as to allow arm 55 with its edge 53 and locking shoulder 51 enough flex to bend towards edge 57 so as to allow the locking shoulder 51 with its rounded tip to be inserted into turntable. Once index is fully seated in the turntable, arm 55 with its locking shoulder 51 will spring back so that 51 will lock against 50, and edge 53 will abutt wall 52, and so on all the way around the inner wall of turntable. When index is fully seated in turntable, the small hole near the tip of arm 55 will be positioned over the elongated hole 58 of turntable.

It is readily apparent that the index can be quickly inserted into and locked to the turntable with one simple movement of the index. This should be done while the turntable is in the measure position. Likewise in the measure position, the index can be quickly disengaged and removed from the turntable. In the measure position, elongated hole 35 of the housing lines up with elongated hole 58 of the turntable. In this configuration, with the whole guide turned upside down, the small hole on the arm of the index can be engaged with a small nail or other small pointed object through the elongated holes. A slight pressure pulling the nail generally along the long axis of the elongated holes will flex arm 55 of the index, unlocking shoulder 51 from shoulder 50, and thus will allow index to be pulled out of turntable. A suitable unlocking pin could be provided with the guide and a storage hole for such pin could be provided on the underside of the housing alongside one of the ribs. Thus such an unlocking pin would be readily available at all times.

FIG. 11 is a longitudinal sectional view of the housing along line 11 in FIGS. 3,4. Longitudinal rib 40 of FIG. 4 is shown as it would be if projected onto line 11 to show its relative size, etc in FIG. 11. The gap between workpiece leading edge 4 and the housing wall whose top surface is 29 is intended so as to allow only two points of contact, the two feet 5, between the guide and leading edge 4 of the workpiece. Any curvature or bowing in edge 4 will not cause the guide to rock or seasaw since the two pressure points of the feet will straddle the curvature and average out the curvature to give the best squaring possible for the guide.

Figure 12:
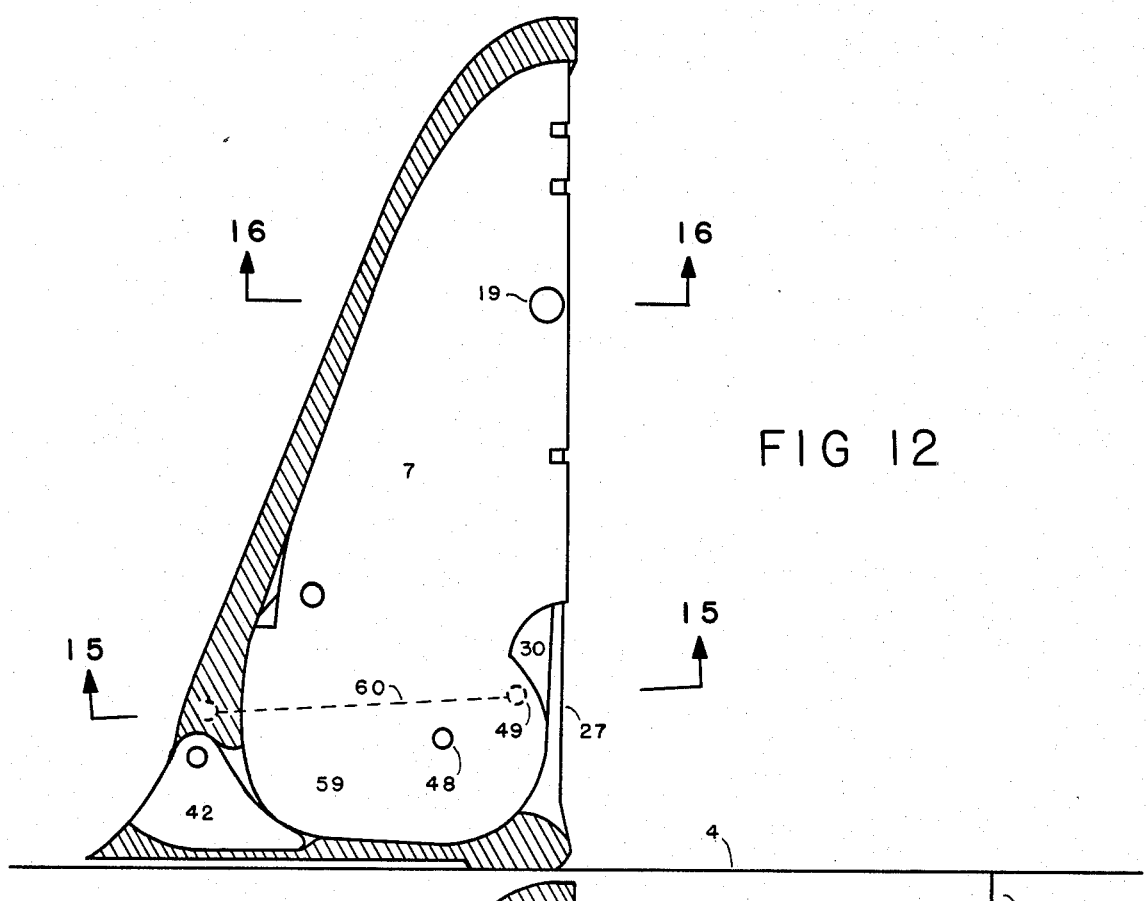

FIG. 12 is a composite plan view, with guide frame removed, of housing, trigger, and turntable 59 with index 7 (59 and 7 shown as one piece for simplicity) in the storage position. The shading on the top surfaces of the housing is as mentioned in the description of FIG. 3. With the turntable and index in the storage position, the trigger 42 and tension spring 60 (the long axis of the spring, showing its line of force, is shown as dashed line 60) are in the cocked position. Spring 60 is connected at one end to the housing via spring hole and post 37 (see FIG. 7) and at the other end to turntable spring hole and post 49 (see FIG. 9). In this storage position spring 60 holds index and turntable in storage by exerting a counter-clockwise rotational force with respect to turntable pivot hole/shaft 48 (hole 48 is aligned with hole 23 of housing as FIG. 3 and aligned with hole 23 of guide frame as FIG. 2). Line 15 gives a transverse section of the above configuration in FIG. 15. Line 16 is a transverse section of housing, index, and return post in the storage position. See FIG. 16.

Figure 13:
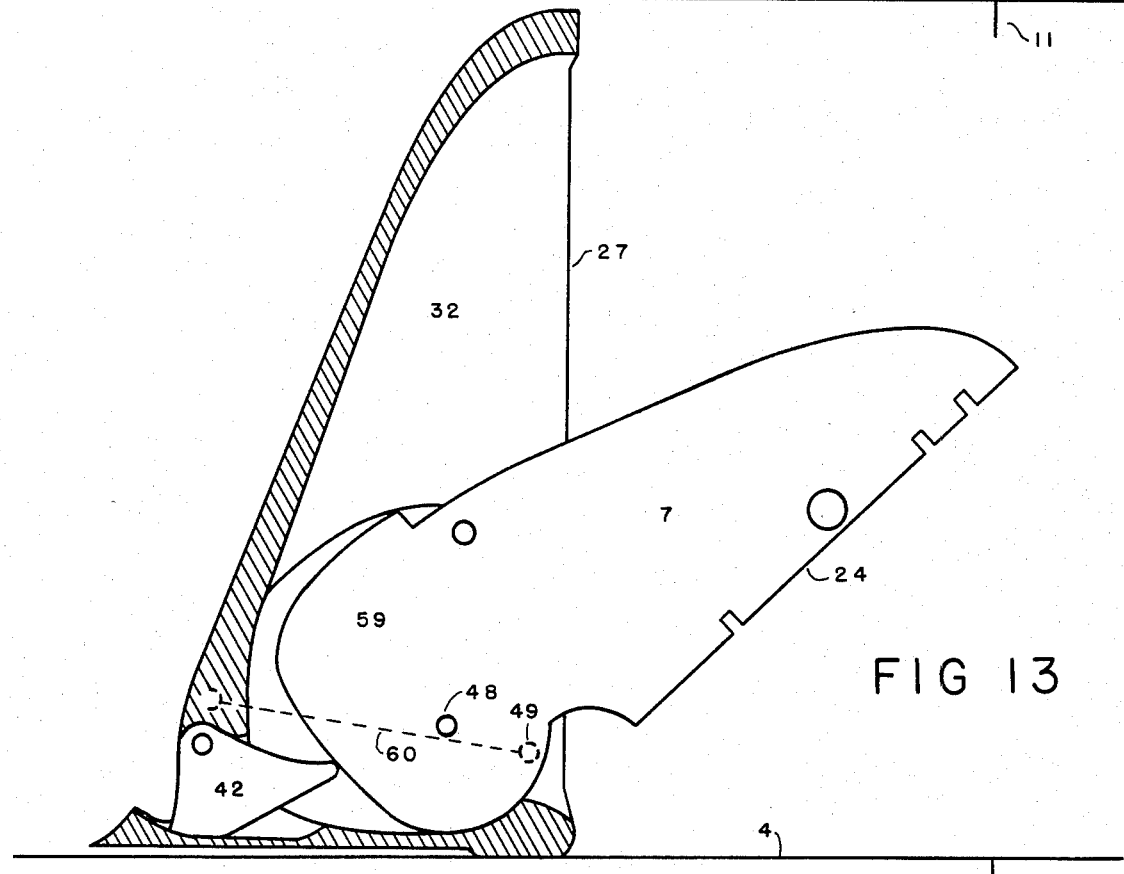

FIG. 13 is a composite plan view similar to that of the last figure except that trigger 42 has been depressed by the left index finger to its maximum travel position. The trigger may be squeezed once the left hand has roughly positioned the guide onto the workpiece or it may be squeezed while the left hand is still bringing the guide through the air to the workpiece. The squeezing of the trigger induces a clockwise rotational force upon turntable 59, overcoming the counter clockwise rotational force of spring 60 in the storage position, thus causing the turntable to rotate clockwise around pivot hole/shaft 48. The maximum travel of the trigger brings the turntable to such a position that its spring post 49 so positions spring 60 so that spring is now on the other side of pivot hole/shaft 48. Now at this position spring 60 exerts a clockwise rotational force on turntable 59 and index 7, causing them to continue rotating to the measure position, otherwise referred to as the measurement position.

Figure 14:
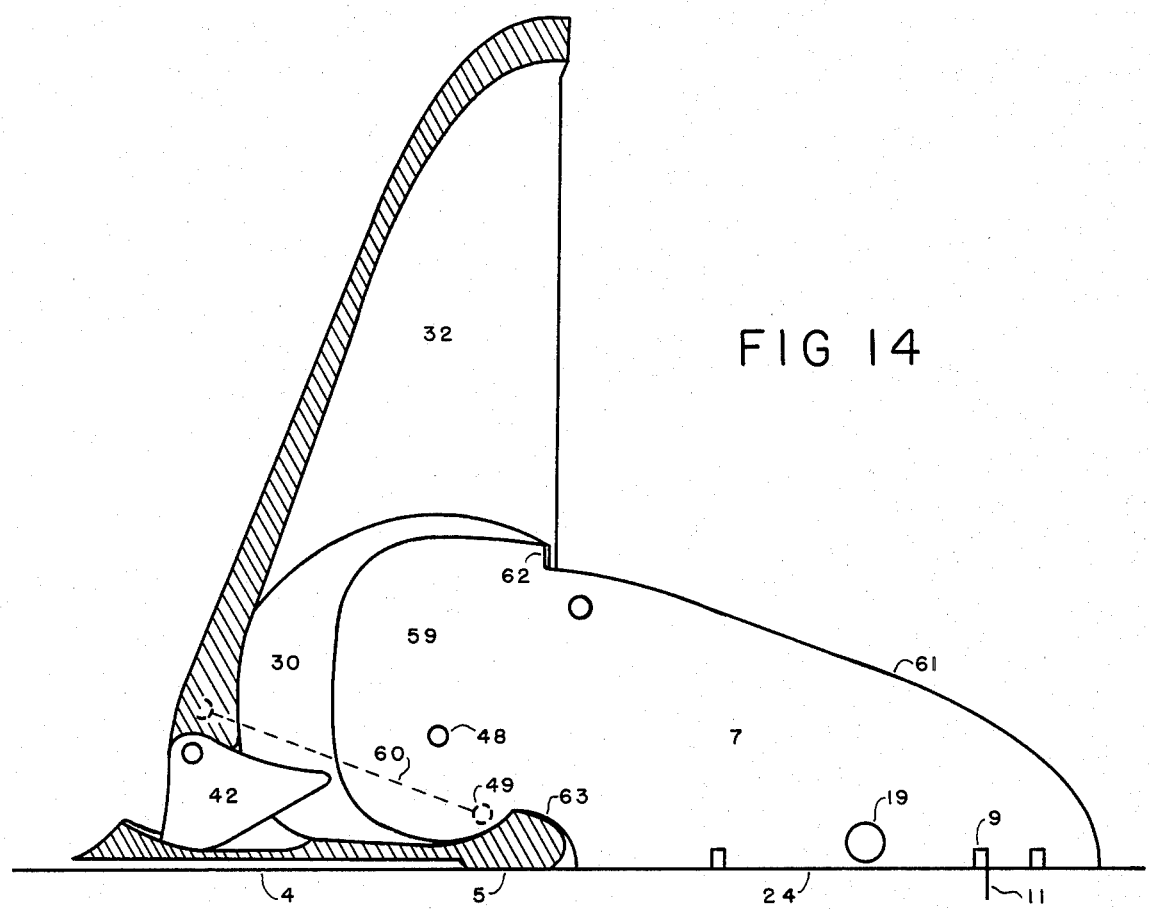

FIG. 14 is a composite plan view similar to the last two figures except that the turntable and index are in the measure position with leading edge 24 of index being held snugly against workpiece leading edge 4 by spring 60 which is still exerting a clockwise rotatinal force. FIG. 14 shows the guide and index so positioned on workpiece, according to notch 9, such that the kerf of the cut will be on the left side of mark 11. Trigger 42 remains in the maximum travel position, both in FIGS. 13, 14.

Once most of the cut is accomplished, leading edge 21 of the saw table 22 will come in contact with return post 19 and begin rotating index and turntable, via return post, in a counter clockwise direction, overcoming the clockwise tension of spring 60 in the measure positon. Once the saw with its advancing table 22 rotate index/turntable to the position shown in FIG. 13, the cocking process begins. Further counter clockwise rotation caused by the saw table causes turntable 59 with its outer wall to begin to cause trigger 42 to rotate clockwise back towards its cocked or storage position. Also once the saw table causes the turntable to rotate such that turntable spring post 49 causes spring 60 to be positioned on the other side of pivot hole/shaft 48, then spring changes its direction of rotational force and exerts a counter clockwise rotational force on turntable, thus causing it to return to the storage position. The index/turntable rotation from the measure to the storage position thus automatically cocks the trigger/spring mechanism for the next gauging operation.

Gap 62 between the shoulder of the turntable and the shoulder of the turntable well, and gap 63 between index and the back side of right foot 5 are such that index will be allowed to rotate just slightly beyond the normal measure position should a slight curvature or bowing in workpiece leading edge 4 necessitate the index to rotate slightly further than normal so as to form a snug fit of index leading edge 24 against leading edge 4 of workpiece. In almost all cases, there will be a slight gap at 62 and 63, and index will be held snug against leading edge 4 by spring 60.

Figure 15:
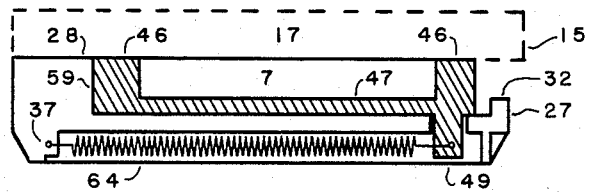

FIG. 15 is a transverse sectional view of FIG. 12 along line 15, showing housing and parts in the storage position. Upper guide frame portion 17 and its guide edge 15 is shown by dashed lined, and extends out further than edge 27. Turntable 59 is shaded. Index 7 fits snugly into turntable and rests upon index bearing surface 47. Turntable spring hole and post 49 hold one end of spring 64 (which spring is shown as dashed line 60 in FIGS. 12-14). Housing spring hole and post 37 secure the other end of spring 64. Spring is protected by ribs surrounding it. A small portion of index bearing surface 32 can be seen. Top surfaces 28 of housing and 46 of turntable fit closely to underside of upper guide frame 17. Actual clearance tolerance necessary for turntable and index to rotate freely is not shown.

Figure 16:
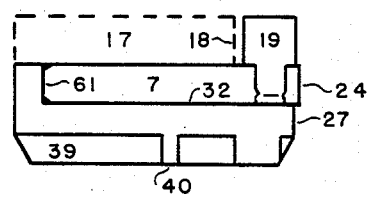

FIG. 16 is a transverse sectional view of FIG. 12 along line 16. Index 7 has its back edge 61 beveled for easier return of index into housing/guide frame sheath. Transverse rib 39 (see FIG. 4) is shown as projected onto line 16. Longitudinal rib 40 is seen. Upper guide frame section 17 is shown by dashed lines and is shortened by notch 18 to accommodate storage of return post 19. Leading edge 24 of index slightly overhangs leading edge 27 of housing. Index support surface 32 of housing is seen.

FIGS. 17-30 show a modified form of the embodiment described above. The major modification is that the guide is changed from being a fixed 90° cut-off guide to an angle adjustable cut-off guide for angles from 90° (square) to 45° off from square with respect to leading edge 4 of workpiece. This is the second embodiment. The descriptions given below for the angle adjustable embodiment in FIGS. 17-30 will not repeat the principles, details, and procedures already described for the fixed embodiment; but descriptions will be given only where modification of the fixed guide is incorporated. Where parts are the same in both embodiments, the same part number is used. Section lines 29 and 30 in many of the figures of the various parts are shown. FIGS. 29 and 30 give sectional views of the parts assembled together into a complete guide.

Figure 17:
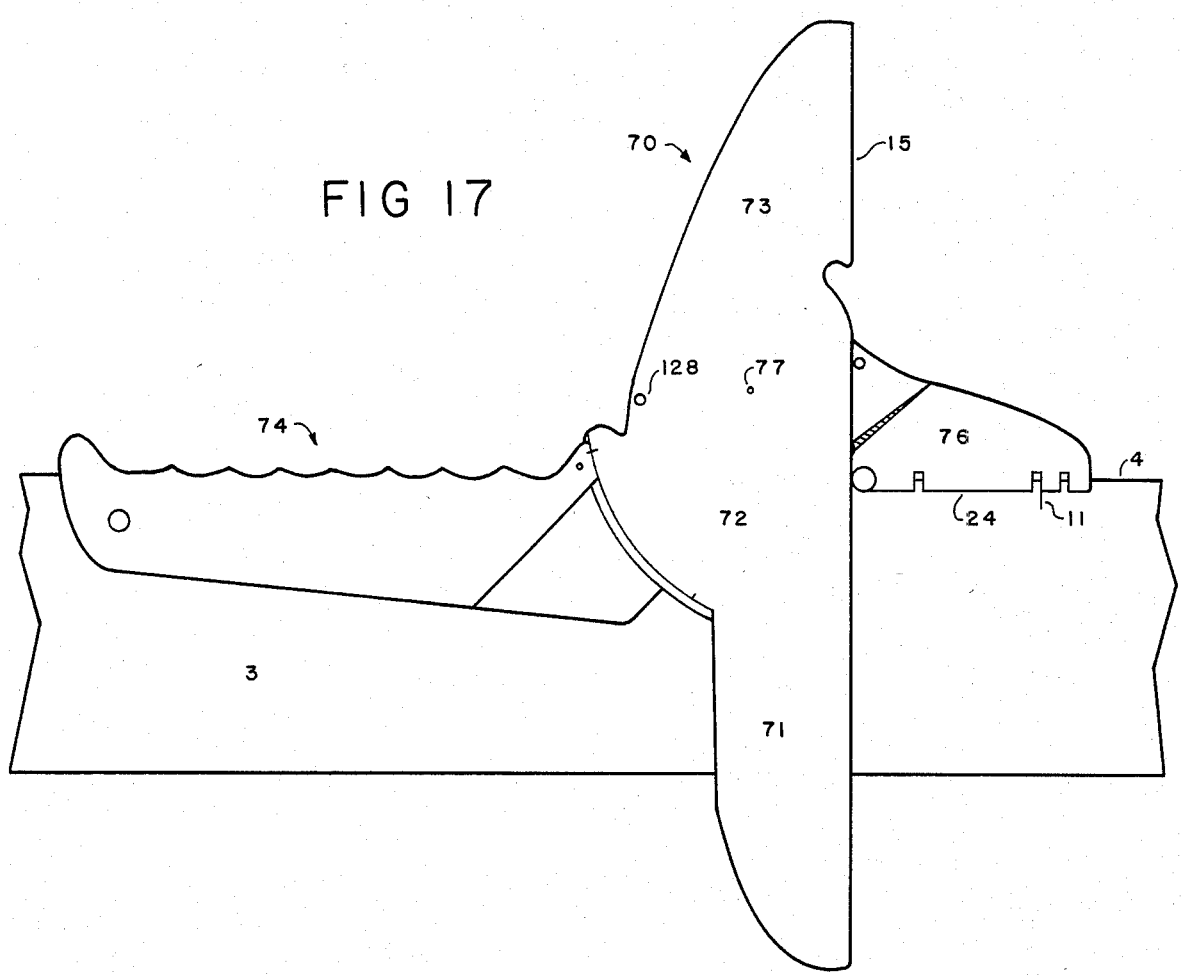
Figure 18:
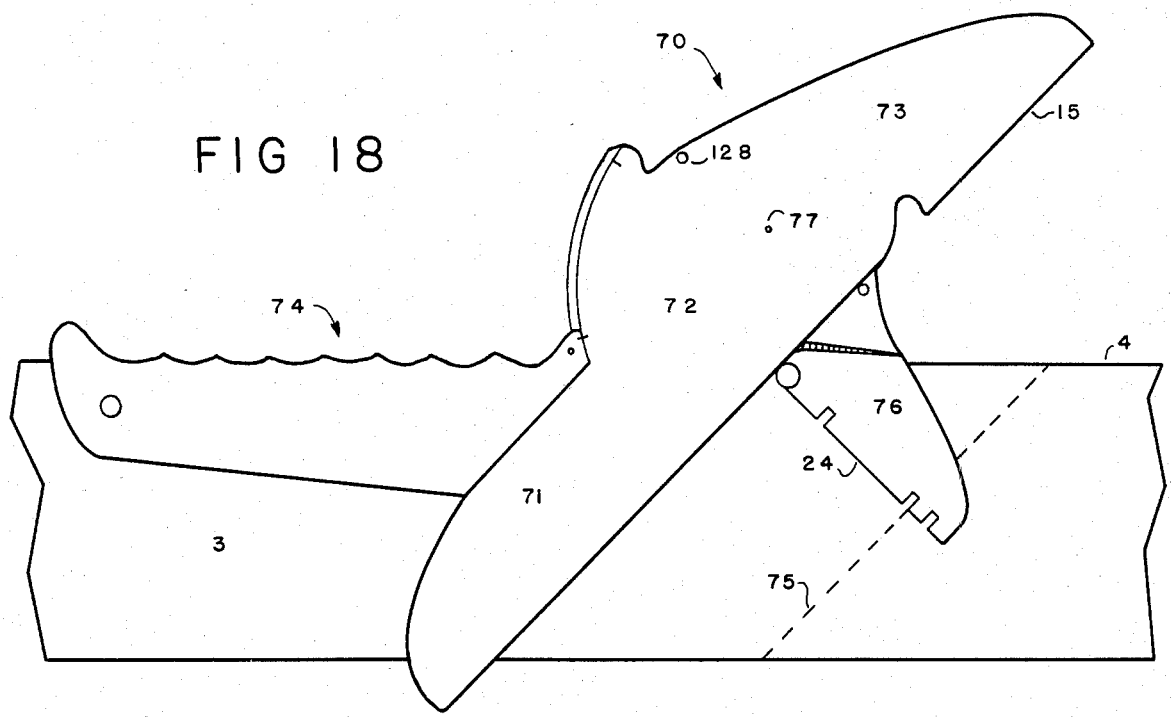

FIG. 17 shows a plan view of the angle adjustable guide set at 90° for a square cut. FIG. 18 shows the guide set for a 45° cut. Both show a 2×6 as a workpiece. Dashed line 75 represents the line of cut desired for a 45° cut in FIG. 18. Square cuts only require a mark, 11, at leading edge 4 whereas angle cuts require a line, as 75, to be drawn across top surface 3 of workpiece. Guide frame 70 is of one piece and is composed of a lower 71, a middle 72, and an upper 73 section. Handle 74 is pivotally mounted to the guide frame via the housing (described later). Index 76 is pivotally attached to the guide frame 70 and housing by means of pivot hole/shaft 77 in frame and 23 in housing. Index 76 rides up onto the top surface of workpiece 3 in varying amounts, depending upon the angle the guide is set for, in order to maintain a right angle (fixed relationship) between guide edge 15 and leading edge 24 of index. Length of guide edge 15 from leading edge 4 to tip of lower section 71 is 9 inches at 90° position, giving a cutting width capacity at 45° of a 2×6 as shown in FIG. 18.

FIGS. 19-27 show parts of the adjustable embodiment and FIGS. 28-30 show views of the assembled embodiment.

FIG. 19 shows the one piece handle generally designated 74 composed of several areas: contoured hand grip 78 with hanging hole 79; right and left feet 5; upper rotation plate and surface 80 for guide frame; lower rotation plate and surface 81 for housing; handle wall sides 82 and 83; lock hole 84 for main guide frame angle plate (described later); notch and lip with angle indicator mark 85 for guiding guide frame angle plate; contour line 86 on underside of rotation plate 81 indicating end of ⅛ inch thickness of said plate; contour line 87 on underside of rotation plate 81 indicating start of 1/16 inch thickness of said rotation plate. Lower rotation plate edge 88 is 1/16 inch thick along its curved edge and varies from 1/16 to ⅛ inch along its straight edge. Also shown are elongated index unlock access hole 89 and guide frame/housing rotation hole 90.

FIG. 20 is a sectional view of handle along line 20 of FIG. 19 through lock hole 84 and rotation hole 90. Lower rotation plate is ⅛ inch thick except for a small portion where it begins to decrease where section line 20 crosses contour line 86. Handle wall sides 82 and 83 are clearly shown. A small portion of upper rotation surface 80 is seen which is adjacent to and under notch, lip, and angle indicator 85. Lock hole 84 is seen, however the actual locking mechanism to lock the guide frame angle plate and lip (described later) to the notch and lip 85 of handle 74 is not shown. Part of the first contoured finger grip of handle 78 is also shown.

FIG. 21 shows index 76 which has several major modifications in principle and detail from index 7 of the first embodiment. The angle adjustable feature of this embodiment requires that a portion of the index rides onto the top surface of workpiece 3 in the measure position. FIG. 17 shows the minimum index overlap onto workpiece for 90° angle setting and FIG. 18 shows the maximum overlap for 45° angle setting. Index 76 has an upper level section 91 which is ⅛ inch thick and is the portion that rides onto and rests on the top surface of workpiece. A sectional view of index is shown in FIG. 29 and will be discussed therein. The lower level section 92 of index is 3/16 inch thick, the top surface of section 92 is in the same plane as the bottom surface of 91. Dashed line 93 represents the vertical surface of transition in elevations from bottom of 91 to bottom of 92. Lines 94 with shading between represent the sloping surface of transition between top of 91 and top of 92. Dashed line 95 represents a slight bevel on lower edge of leading edge 24 so as to facilitate index to ride onto workpiece. Return post hole 96 is for normal cutting operations and hole 97 is for calibration operations. See description under FIG. 6 for and alternative design to the snap-lock feature of these holes. Index has three grooves or shoulders 98 for interlocking with turntable to prevent tipping action of index in turntable. Straight edge 99 of index is a positive stop to not allow index to rotate beyond 90°; edge 99 stops against guide edge 15 in the measure position.

FIG. 22 shows an underside plan view of concentric upper and lower sections of return post 102 and a side view of same. Upper section of post is 5/16 inch high, lower section of post is ⅛ inch long. See description under FIG. 6 for an alternative locking design.

FIG. 23 is a plan view of top side of turntable, generally designated 69. Three grooves or shoulders 100 mate to and hold shoulders 98 of index. During the rotation cycle from storage to measure positions, and vise versa, turntable and index change elevation by ⅛ inch with respect to guide frame, housing, and top surface of workpiece. Details for the process will be given later. For this process of elevation change, three arcuate ridges are formed on the top surface 46 of turntable walls. Each of these ridges has a central flat surface 101 which is parallel to surface 46. Shaded portions 103 on either side of flat 101 are sloping surfaces. Turntable 69 has a height (exclusive of spring post and ridges) of ⅜ inch: 3/16 inch index wall height plus 3/16 inch index resting plate thickness. Ridge height is 5/32 inch.

FIG. 24 is a plan view of the underside of turntable. Three concentric grooves 104 are 1/32 inch deep relative to turntable undersurface. Two concentric grooves 105 are 5/32 inch deep. Three concentric sloping grooves 106, shaded, change in elevation from that of groove 104 to 105. Slope 106 of the outermost groove is truncated by turntable edge. More detail will be given later. Turntable spring post 49 is shown.

FIG. 25 is a plan view of top of housing, shown generally as 107. Vertical surface or wall 108 matches shape of wall 82 of handle 74 (see FIG. 19) and in the 90° position they continuously abut one another throughout their length. Housing walls top surfaces 115 and 116, shaded, are ¼ inch above trigger bearing surface 31, are ⅛ inch above housing well surface 109, are 5/16 inch above lower index bearing surface 110, are ⅛ inch above upper index bearing surface 111, and are 3/16 inch above index support surface 113. Lines 112 with shading between indicate a sloping surface from 110 to 113. Hole 114 lies directly over hole 90 in handle 74 and it receives pivot shaft/shoulder screw enabling the housing and attached guide frame 70 to rotate to any angle between square and 45°. Wall projection 117 acts as a stop for index in the storage position. The size and shape of well surface 109 is the same as surface 30 (see FIG. 3) except that three concentric arcuate ridges in well surface 109 about hole 23 match the respective three grooves in the bottom of turntable as shown in FIG. 24. Three ridge sections 119 (one is not labled) are each 1/32 inch above surface 109. Three shaded sloping sections 120 (one is not labled) each change in elevation from 1/32 to 5/32 inch above surface 109. The slope 120 is the same as its corresponding slope 106 of turntable in FIG. 24. Three ridge sections 121 (one is not labled) are each 5/32 inch above said surface. Two sloping sections 122 change from 5/32 inch above 109 to the same elevation as 109. One sloping section 123 changes from surface 109 elevation to 1/16 inch above it. Housing edge 118 is shown.

FIG. 26 shows the plan view of the underside of housing 107. The rib system that is enclosed by lines 124/125 forms a bearing surface for housing to rest and rotate upon lower rotation surface 81 of handle 74. Line 124 represents the leading edge of a lip on a rib which overlaps the underside of perimeter (edge 88 of FIG. 19) of lower rotation surface 81. Dashed line 125 is the inner edge of the lip which, in the 90° position, fully contacts the straight and curved portions of lower rotation plate edge 88. In other angle positions, only part of the curved portion of inner edge 125 will come in contact with part of the curved portion of edge 88. Ribs outside of enclosing rib and lip 124 vary in depth. See FIGS. 29 and 30 for sections of the above. Dashed line 126 and dashed circle at left end of 126 represent spring and turntable spring post in the storage position. Dashed line 127 and dashed circle at left end of 127 represent spring and turntable spring post in the measure position. Guide frame/housing angle pivot hole 114 is in a built up portion of rib system.

FIG. 27 is a top view of all of central portion 72 and parts of upper 73 and lower 71 portions of the guide frame 70. Index pivot shaft/hole is 77. 128 is top of hole for trigger pivot shaft/shoulder screw. Arcuate angle plate 129 is marked in degrees from 90° (square) to 45°. Cross section of lip 130 of plate 129 mates shape of notch and lip 85 of handle 74 and travels through 85 as guide frame is moved for desired angle setting. All of guide frame within dotted line 131, including angle plate 129 and lip 130, is hollowed out on the underside by ⅛ inch to receive ⅛ inch thick upper rotation plate 80 of handle 74 (see FIG. 29 for detail). Full thickness of guide frame of 5/16 inch less ⅛ inch in above hollowed out area leaves a thickness of 3/16 inch in this part of the frame. Guide edge 15 forms a full 5/16 inch thick lip in the section where line 131 is parallel to guide edge 15.

Three arcuate grooves around hole 77 on the underside of guide frame, shown as dotted lines, guide the ridges in top side of turntable as turntable rotates. Three grooves 132 are each 1/32 inch in height above the underside of guide frame. Three sloping grooves 133, shaded, each varying in height from 1/32 to 5/32 inch above the underside of frame. Sloping grooves 133 have the same slope as their respective ridge slopes 103 of turntable in FIG. 23. Three grooves 134 are each 5/32 inch above underside of frame.

Notch 135 in guide edge 15 is to receive return post 102 in the storage position. Dashed contour line 136 is line of change in elevation on underside of frame from full thickness of 5/16 inch to 1/16 inch less than full thickness, giving ¼ inch at dashed line 137. Area from line 137 to guide edge 15 continues to change elevation at the same slope as area 136 to 137. This sloping undersurface area of guide frame allows clearance of corner 68 of upper section 91 of index (see FIG. 21) when index is in one portion of one phase of rotation and change in elevation.

FIG. 28 is a composite plan view in the 90° position showing relationship between: portions of the central and lower guide frame with its angle plate; guide edge 15 with notch 135; housing 107 with guide frame not shown over housing; simplified turntable 69 and index shown in the storage position 138; portion of index (dashed) in two intermediate positions 139 and 140; portion of index in measure position 141; spring and turntable spring post (dashed) in two positions 126 and 127; and workpiece 3. The shading on the top surfaces of the housing is as mentioned in the description of FIG. 3.

The index in the storage position is labled 138 and turntable 69 is also shown in the storage position, as well as spring and turntable spring post 126 (dashed). Spring in this position is holding index and turntable in the storage position. In the storage position it can be seen that housing edge 118 is overlapped by index edge 24 which in turn is overlapped by guide edge 15.

As trigger (not shown) is being depressed, it overcomes spring 126 counter clockwise force, causing turntable and index to begin rotating clockwise from index storage position 138. As turntable begins to rotate around its hole/shaft 48 (same as hole 23 of housing and hole 77 of frame), the three ridges on the top of the turntable simultaneously are guiding along their respective grooves in the underside of the guide frame; also simultaneously the three grooves in the underside of the turntable are guiding along their three respective ridges on the turntable well surface of the housing. Index continues clockwise rotation from trigger pressure until just past index position 140. However, somewhere between position 139 and 140 spring centerline passes over pivot hole/shaft 23/48/77 and thus spring force changes from counter clockwise to clockwise; spring then ceases to oppose trigger pressure and begins helping the clockwise index rotation.

Clockwise index rotation from index position 138 to position 139 continues all in the same plane. However from position 139 to 140 there is not only clockwise rotation, there is also a change in elevation of ⅛ inch upwards from 139 to 140 for both index and turntable. When turntable has rotated in one plane from corresponding index positions 138 to 139, the flats and slopes on the ridges and grooves of the turntable, housing and guide frame will simultaneously begin causing an elevation change as further rotation past 139 takes place. These ridges and grooves cause a level and uniform rate of change of elevation of turntable/index until position 140 is reached. FIG. 30 shows sectional view where index/turntable is in a position mid way between 139 and 140. Further rotation, from position 140 to 141 (measure position), will again continue all in one plane, this second plane being ⅛ inch higher than the first phase (138 to 139) of rotation in one plane. Positive stop edge 99 (FIG. 21) of index will contact guide edge 15 at 90° and will stop any further index rotation. Spring will hold index in this position.

The ⅛ inch index elevation change allows the underside of upper index section 91 to ride onto the top surface of workpiece 3. The location of index position 140 where index has completed its elevation change and is "up" allows index to be triggered or activated from the storage position so as to clear workpiece leading edge 4 while guide is on workpiece at the maximum angle setting of 45 (as in FIG. 18).

Return post 102 is so positioned on index that its circumference almost touches guide edge 15 when index is in measure position; and so positioned that its circumference slightly overlaps index edge 24. Note curve of index edge near hole 96 and between edges 99 and 24 in FIG. 21. Above curve of index edge and position of post 102 allow leading edge 21 of saw table 22 to engage post 102 without table edge 21 coming in contact with index edge 24 at any time during the index returning to storage cycle.

FIG. 29 is a sectional view on line 29 of many figures showing the assembled saw guide with its turntable/index in the storage position at a guide angle of 90°. Most of guide frame is shown in its lower 71, middle 72, and upper 73 sections. Hole/shaft 77 in middle section 72 has threaded hole for the turntable pivot shaft/shoulder screw. Outermost groove 134 in the underside of guide frame is not engaged by outermost ridge of turntable when turntable is in the storage position as shown here. The ⅛ inch hollowed out area in the guide frame extends from vertical line 131 on the left, in section 71, to vertical line 131 in section 72 where upper part of handle wall side 82 is directly in contact with said edge 131. Vertical line 142 shows the extent of the handle occupying the hollowed out area 131 of the guide frame in the 90° position. Foot 5 is shown. Housing 107 is shown as the shading with lines sloping downward to the right. Housing 107 is attached to underside of guide frame. The rib structure of housing is shown, including lip 124 which overlaps and helps to secure housing to lower rotation surface and plate 81 of handle yet still allowing housing to rotate on surface 81. While housing rotates and rests on surface of plate 81, guide frame also rotates and rests on upper rotation plate and surface 80 of handle. The position of contour line 86 on the underside of plate 81 shows the beginning of the change in thickness of said plate. Outermost ridge 121 of turntable well of housing is seen and in the storage position shown, turntable is not engaged with said ridge. Turntable 69 is shown and innermost groove 104 on the underside of turntable, in storage position shown, is not engaged with its respective turntable well ridge where section line 29 is taken. Index with its upper section 91 is shown shaded with lines sloping downward to the left. Said index is engaged with turntable 69 and is resting on turntable and housing surfaces. A gap of ⅛ inch exists, in storage position, from top of turntable and top of lower index section to the underside of guide frame. However, there is no gap between index upper section 91 and underside of guide frame. The ⅛ inch elevation increase does not take place until index upper section is in position 139 where all but a little tail end piece of the corner 68 of upper section has cleared guide frame (see end of description for FIG. 27).

The housing spring well is seen containing a circle 126 which is the transverse section of the spring in its storage position. The dotted circle which is slightly above and to the left of 126 shows the same spring in its measure position, showing a change of ⅛ inch in elevation between the two spring positions.

FIG. 30 is a transverse section of the assembled guide along line 30 of most of the preceeding FIGS. 19-28. The section shows turntable at mid elevation, halfway between index positions 139 and 140 of FIG. 28. Thus there is an equal gap of 1/16 inch above and below the turntable relative to the underside of the guide frame and the turntable well surface. Grooves 133 and 134 in the underside of the guide frame are seen with groove 133 partially engaged by one ridge 101 of top of turntable 69. Also mid height point of innermost sloping ridge 120 of turntable well and its corresponding innermost groove on underside of turntable are seen engaged. A third engagement of a groove/ridge is seen but not numbered to the left of turntable number 69. Two shoulders 100 of turntable (only one is numbered) engage corresponding shoulders 98 (not here numbered, see FIG. 21) of index (not numbered here but shaded with lines sloping downward to left). Pivot shaft/shoulder screw for turntable is secured in threaded hole 77 of main frame. Housing 107 is shaded with lines sloping downward to right.

Lower rotation plate 81 is here enclosed at both edges by lip 124. Shaft/shoulder screw in hole 90 of lower plate 81 and in threaded hole 114 of housing is the pivot shaft for the housing and guide frame to rotate with respect to handle 74. Housing surface 113 with housing edge 118 is shown. When turntable is at mid elevation position, spring is parallel to top surface 81 of rotation plate. Left end of spring which is attached to housing always remains at the same elevation, whereas right end of spring attached to turntable spring post changes elevation by a total of ⅛ inch from index position 139 to 140 and from 140 to 139

FIGS. 31 and 32 show yet a third embodiment of this invention—that is, a simplified variation of the angle adjustable embodiment just described in FIGS. 17-30. This third embodiment eliminates the need for an elevation change in the index. This elimination is accomplished by maintaining the index in all positions at an elevation so that the underside of the upper portion of index is in the same plane as the top surface of the workpiece.

FIG. 31 is a composite plan view showing guide frame guide edge 15; housing (housing top surfaces shaded); trigger; index with upper section 143 and lower section 144 in the storage position; part of index in the measure position; turntable 146 in the storage position and as if it were one piece with the index; and workpiece leading edge 4. Turntable 146 is a total of 5/16 inch thick (exclusive of spring post): 3/16 inch index wall height plus ⅛ inch index resting plate thickness. Turntable 146 is shaped like turntable 69 of FIG. 23 with its three shoulders 100, etc but with no ridges or grooves on the top or bottom.

Index upper level section 143 (⅛ inch thick) and lower section 144 (3/16 inch thick) are shaped a little differently from index 76. Note that in the storage position index leading edge 145 is in the same plane with guide edge 15; this is accomplished by rotating index and turntable slightly clockwise in the storage position (relative to previous embodiment) and shaping index leading edge 145 to be in the same plane as edge 15. Above adjustment results in index leading edge 145 not being parallel with workpiece leading edge 4 when index is in the measure position; however, this causes no limitation in accuracy or in operational effectiveness. Rather this allows return post 147 with its circumference lying even with edge 145 to contact saw table leading edge 21 without edge 21 coming in contact with edge 145.

Omitting the ⅛ inch elevation change mechanism of the previous embodiment (second embodiment) requires that in the storage position the upper section 143 of the index be "housed" within the outline of guide frame (compare locations of upper level sections of indicies in FIGS. 29 and 32). Hence in this embodiment, as the cutting operation progresses and the index is returned automatically to the storage position (first by the force of the saw table edge 21 and then by spring action), leading edge 145 of the upper level section 143 of index also assumes a role as part of guide edge 15.

FIG. 32 is a sectional view of FIG. 31 in the storage position along line 32. The guide frame is also included. Shading is as in FIGS. 29 and 30. Compare the overall thickness of this embodiment with respect to FIG. 29. The shape of handle 148 conforms to the lesser thickness of this embodiment. Also note that there is only a horizontal shift in spring positions (as in the first or fixed embodiment of this invention).

Calibration of the angle adjustable embodiments of this invention (wherein a portion of the index rides onto and rests on the top surface of workpiece) is best accomplished with the guide set at the 90° (square) position. For a square blade setting on the saw the calibration procedure is the same as in the fixed or first embodiment; however, the saw table should be helped to ride onto the ⅛ inch thick upper section of index which is sitting on top of the worksurface, in order to cut about a ¼ inch long notch in the index.

Calibration of the index of the second and third embodiments leads to a complication for saw blade angles other than square—for bevel angles of the saw blade. This complication is caused by the upper level section of the index sitting on top of the workpiece instead of even with the the top surface of workpiece as in the first embodiment. This elevates, during calibration, the forward portion of the saw table with respect to the top surface of the workpiece; and thus produces a horizontal error in the positioning of the calibration notch(s) with respect to guide edge 15. In the first embodiment, where the top surface of index is in the same plane as the top surface of workpiece, the outline of the calibrated notch(s) on the top side of the index represents the actual position of the kerf on the top surface of the workpiece during an actual cutting operation. However in the second and third embodiments, where the top surface of the upper level section of index is ⅛ inch above the plane of the top surface of workpiece, the outline of the calibrated notch(s) on the underside of the upper level section of index represents the actual position of the kerf on the top surface of the workpiece during an actual cutting operation (this is because the undersurface of the upper level section is in the same plane as the top surface of workpiece).

The horizontal error, with respect to guide edge 15, of the notching of the index for bevel angle calibration to produce a true position notch(s) on the underside of the upper level section of index is a function of two variables. One variable is proportional to the tangent of the bevel angle multiplied by the thickness of the upper index (⅛ inch). For square saw angles this variance is zero error. The second variable, which modifies and lessens the first variable, is proportional to the actual effective height of the saw table (the blade having a fixed relative relationship to said saw table) above the top surface of workpiece. This effective height is a function of the forward elevation of the table riding onto the index and the rearward elevation of the table supported by the workpiece. To overcome the above stated variables which give some error for bevel angle calibrations, a calibration jig for bevel calibrations for indicies of the second and third embodiments is shown in FIG. 33.

FIG. 33 is a small scale plan view of a calibration jig resting on a 2×4 workpiece 150. This jig is designed to hold a second or third embodiment type index in precise elevation position so that the top surface of the upper level section (as 91 of FIG. 21 or 143 of FIG. 31) of the index is in the same plane as the top surface of the workpiece. Said jig also holds said index in precise horizontal position relative to its measure position with respect to guide and guide edge 15 (so that guide edge 15 and jig edge 151 are in effect interchangeable) in all respects except for a necessary parallel displacement of index leading edge with respect to leading edge 4 of workpiece so as to allow top surface of upper level section 91 or 143 to be lowered and placed within the same plane as top surface of workpiece. There is a lateral correction adjustment in the jig for said index positioning relative to jig edge 151 by an amount necessary to correct for the tangent error according to the selected bevel angle of the saw.

Most portable power hand circular saws have the blade 12 to the right of the motor housing (see FIG. 2). Thus for bevel angle settings on such saws there will be a correction factor for calibration of said indicies which must be applied by a shift of the index to the left (left correction) relative to guide edge 15 or jig edge 151. This is the case illustrated in FIG. 33 and described in detail below. For those power saws with the blade mounted on the left side of the motor housing (as with most worm drive saws), the bevel angle correction will be the same amount but must be applied by a shift of said index to the right relative to edge 15 or 151 (right correction). This can be provided for by supplying an extra jig head (jig head described below) having a right correction scale formed on it. Both the right and left correction jig heads are interchangeable in the lower jig section. This right correction jig head will not be further described.

To keep jig size as compact as possible, it is designed to be used in conjunction with a small workpiece 150 such as a 2×4. The jig is cast in two sections, line 158 showing the joint of the two sections on the top surface of the jig. Dotted line 161 shows the extent of the tongue of the jig head section 162 penetrating the lower section 163. Sections 152 and 153 are two areas of jig lower section 163. Jig area 152 (below line 154) is ¼ inch thick and rests on workpiece 150. Jig area 153 (between lines 154 and 158) is 11/16 inch thick. The top surface of 152, 153, and 159 are all in the same plane. Vertical wall surface 154 is along line 154 and is a flange or two feet formed therein to help position and secure jig to workpiece leading edge 4. The jig head section 162 is laterally adjustable up to ⅛ inch with respect to lower section 163 to compensate for the tangent error mentioned earlier. This is the left correction jig head 162. A vernier type scale is formed along joint line 158. The scale from 0° to 45° along the lower side of the joint (on area 153) is linear in spacing; having marks every 5° which corresponds to the marking on the bevel angle scale of most saws. The scale fron 0° to 45° on area 159 is corrected for the tangent of the saw bevel angle range of 0° to 45° for an index upper level section thickness of ⅛ inch. Thus with the two zeros lined up (for a bevel angle of 0° off from the vertical blade position—where blade is at right angles to saw table) there is no correction necessary. With the zeros lined up, there is a difference of ⅛ inch between the two 45° marks. Thus for a saw bevel angle of 45° off from the vertical blade position, the two 45° marks should be lined up which would shift jig head section 162 and the index attached to it by ⅛ inch to the left with respect to jig edge 151. This shift of the index causes saw blade at 45° to notch index so that notch outline on the undersurface of the upper level section of index, when index is transferred and locked into saw guide in the measure position, represents the actual position of saw blade at 45° bevel on the top surface of workpiece with respect to saw table edge 14 and guide edge 15.

Jig head section 162 has a rectangular (in cross section) tongue protruding from it (starting at joint line 158 and ending at dotted line 161) which engages a similar shaped groove in lower jig section 163. There is a V shaped ridge and matching groove (not shown) on the upper and lower surfaces of said tongue and in the walls of said matching groove of lower jig section 163 so as to allow jig head section 162 to move laterally with respect to lower jig section 163 but not allowing the jig sections to spread apart from each other. Hole and countersink 160 are for a bolt and wingnut to tighten the groove sides of lower section 163 against the tongue of jig head section 162 so as to lock the sections together at the selected bevel correction. The hole 160 in the tongue of the jig section is enlarged to a slot to allow jig head to laterally move a total of ⅛ inch.

Index resting plate 155 is ⅛ inch thick. The upper surface of 155 is 9/16 inch below top of area 159. Top surfaces of sections 156 and 157 are 3/16 inch above top of 155. The configuration and size of surface 155 with its surrounding walls containing three shoulder grooves 100, one shoulder 50, etc are all the same as in turntable 69 in FIG. 23 and perform the same function: to quickly receive, securely hold, and quickly release index. The break between walls of sections 156 and 157 allow a finger to quickly trip arm 55 of index (see FIG. 10) to release index from jig. Calibration of index in jig follows the same procedure as for calibration in the first embodiment except that when jig is used, the return post is not put upside down in hole 97 (see FIG. 21) but is just kept separate during calibration. Also, of course, the bevel angle correction must be set on the jig scale. After calibration, index is released from jig and inserted into turntable of saw guide. When not being used, jig should be stored in the carrying case mentioned earlier. Also an extra jig head for the right correction shift for certain saws should be kept on hand in the carrying case.

The means of fastening the housing to the underside of guide frame is not shown for any of the embodiments. In the final design, the actual joining surface of the housing wall to the guide frame may best occur somewhere mid way in the wall, with the upper portion of the wall being cast as one piece with the guide frame.

It would seem that both a fixed (square) and an adjustable angle guide would be desirable. The fixed guide would be smaller and lighter and thus handier to use for the majority of cut-off operations.

A guide with a bigger index capacity could be built, such as for a 10 inch circular saw with a table width to blade of about 6 inches. Such a guide would be very handy for such a big, heavy saw but since such saws are relatively few, it may not be feasable to manufacture such a guide size.

The above descriptions of the three typical embodiments of the present invention are in no way intended to limit modification or improvement of said invention by those skilled in the art. The embodiments described above are intended to illustrate the principles of this invention, not exact shapes or dimensions The items claimed as new in this invention are as follows:

1. A saw guide comprising:
   a guide member with an elongated guide edge;
   flange means upon said guide member adapted to abut the edge of a workpiece, the edge of said flange means being at right angles to said elongated guide edge;
   an index member having a straight edge portion, said index member being pivotally mounted to said guide member so as to be moveable to a measurement position from a storage position, wherein said straight edge portion abuts the edge of a workpiece in the measurement position;
   means for driving said index member from said storage position to said measurement position;
   means for returning said index member from said measurement position to said storage position;
   a measurement mark or marks on said straight edge of said index member;
   said mark or marks indicating the position of the blade of the saw when the saw is guided along said elongated guide edge;
   wherein said guide member is placeable upon a workpiece in such a manner that the table plate of a portable saw may bear against and be guided by said elongated guide edge, thereby facilitating cutting of the workpiece along a path parallel to said elongated guide edge.

2. The apparatus of claim 1 wherein said returning means comprises a post detachably mounted in said index member so as to intercept and entrain the table plate of a portable saw when said saw is moved along said elongated guide edge so as to cause said index member to pivot back towards said storage position.

3. The apparatus of claim 1 wherein there is a locking means to lock said index member in the measurement position.

4. The apparatus of claim 3 wherein said locking means comprises a bore in said index member, said bore being adapted to receive said detachable post so as to preclude rotation of said index assembly away from said measurement position.

5. The apparatus of any of claims 1–4 wherein said driving means comprises an elastic member and a triggering means, wherein said elastic member rotatably biases said index member alternatively towards said measurement position and said storage position, and said triggering means initiates rotary motion of said index member from said storage position towards said measurement position.

6. The apparatus of claim 5 wherein an index assembly comprises a rotary turntable mounted to said guide member wherein the index member is detachable from said turntable.

7. The apparatus of claim 6 wherein said index assembly, said elastic member and said triggering means are mounted within a housing portion of said guide member.

8. The apparatus of claim 1 wherein said measurement mark or marks on said straight edge of said index member is formed by said saw blade notching said straight edge, and wherein said straight edge of said index member is made out of material readily cut by said saw blade.

9. The apparatus of claim 1 wherein said guide member has a handle means operatively attached thereto.

10. The apparatus of claim 1 wherein said flange means of said guide member comprises two feet adapted to abut the edge of a workpiece.

11. The apparatus of claim 1 wherein said index member is so adapted that in said measurement position it does not abut said edge of workpiece, but rather to some extent rests upon or just slightly above the surface of the workpiece.

12. The apparatus of claims 1 and 11 wherein said measurement mark on said index member is formed by said saw blade cutting off a portion of said index member.

* * * * *